July 25, 1944.  J. DE JONG  2,354,581
ARM JOINT FOR DOLLS
Filed March 3, 1943
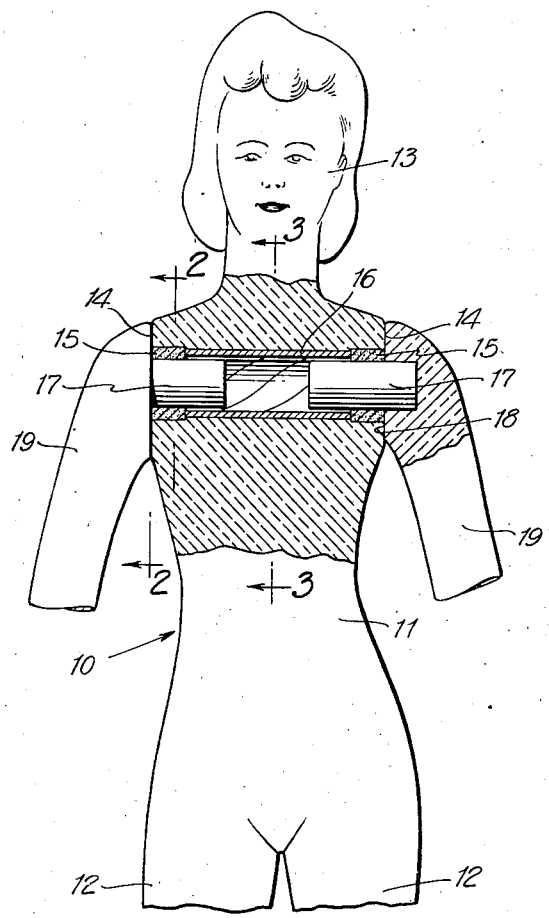
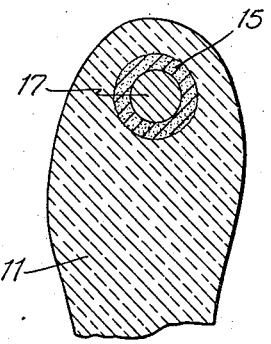
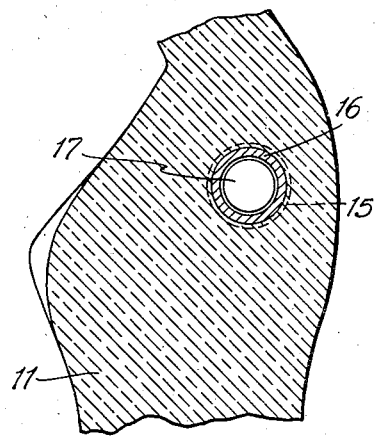
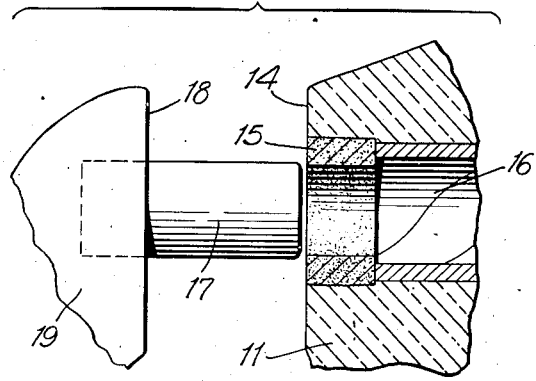
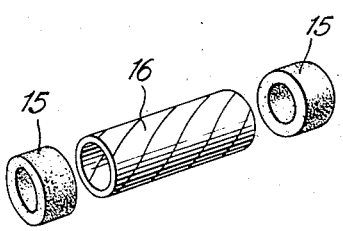
INVENTOR
JACK DE JONG.
BY
Ely & Pattison
ATTORNEYS.
WITNESS:

Patented July 25, 1944

2,354,581

UNITED STATES PATENT OFFICE 2,354,581

ARM JOINT FOR DOLLS

Jack de Jong, New York, N. Y.

Application March 3, 1943, Serial No. 477,836

4 Claims. (Cl. 46—173)

This invention relates to improvements in dolls and more specifically to an arm joint therefor.

The primary object of the invention resides in a novel means of pivotally and detachably connecting arms to the body of a doll or mannequin display figure.

This invention is applicable to dolls, and mannequin display figures which are molded from wood-pulp, plaster, resin and wax compositions, and other substances which are non-resilient. During the molding of the body of the figure, I embed within the body a pair of axially alined resilient friction collars which open through opposite sides of the body and a tubular spacer member intermediate the inner confronting ends of the collars, whereby an open passage is formed to enable round pins carried by the arm members to be inserted through the collars for frictional holding engagement therewith, while permitting pivotal adjustment of the arm members, and also their separation from the body of the figure for packing and other useful purposes.

Another feature of the invention is to fixedly embed the friction collars within the body of the doll or display figure to prevent their separation or shifting movement during the insertion and removal of the pivot pins of the arm members.

Another feature of the invention resides in a frictional pivotal joint for dolls or mannequin display figures which is simple and inexpensive of construction, and which will last for the life of the doll or figure.

Other novel features of the invention will become apparent as the following specification is read in conjunction with the accompanying drawing, in which:

Figure 1 is a front elevational view of a mannequin doll or display figure with the upper portion thereof broken away and shown in section.

Figure 2 is an enlarged detail vertical transverse sectional view on the line 2—2 of Figure 1.

Figure 3 is a view similar to Figure 2 but taken on the line 3—3 of Figure 1.

Figure 4 is an enlarged detail vertical sectional view through one of the arm joints, showing the arm member separated from the body.

Figure 5 is a drawn-out collective perspective view of the friction collars and intermediate spacer member.

Referring to the drawing by reference characters, the numeral 10 designates a doll of the mannequin display figure type which includes a solid torso body 11 having integral lower extremities or legs 12—12, and an integral head 13. The doll body may be made of various moldable materials, such as wood pulp, plaster, resinous and other non-resilient plastic compositions, all of which materials are susceptible to expansion and contraction due to heat, cold, or moisture. The opposite sides of the body 11 adjacent the shoulders are flat and vertical as at 14—14. Embedded in the body 11, inwardly from the flat side surfaces 14—14 are axially alined resilient friction collars 15—15. The outer ends of the collars are flush with the surfaces 14—14 while the inner ends abut a tubular spacing member 16, which has internal and external diameters slightly less than the respective internal and external diameters of the friction collars 15—15. The tubular spacing member 16, like the collars 15—15 is embedded in the material of the body 11 during the molding thereof and said member and collars cooperate to provide a cylindrical bore extending from one flat side surface 14 to the other.

The resilient friction collars 15—15 are constructed of felt, cork, rubber, or other equivalent porous flexible resilient substance. The tubular spacer sleeve 16 is preferably constructed of fibre and may be cut from long lengths of spiral cardboard tubes into proper lengths. It will be understood that by reason of the porous characteristics of the material from which the collars 15 and tubular sleeve 16 are constructed, that the material from which the body 11 is molded will enter the pores of the collars and sleeve and provide a tight bond therebetween. Preparatory to the molding of the body 11, the collars 15—15 and sleeve 16 are threaded onto a short length rod, and the rod properly positioned in the mold. The rod centers the collars and sleeve and also prevents collapsing of the same during the pressure molding operation.

The resilient collars 15—15 respectively receive round wooden pins 17—17 extending inwardly from the inner flat sides 18—18 provided at the upper portion of right and left rigid extremity members in the form of arms 19—19. The pins 17—17 are of a diameter slightly greater than the internal diameter of the collars 15—15 to necessitate a slight pressure to effect insertion whereby a tight friction fit is established between the pins 17—17 and the inner annular walls of the collars 15—15. This friction fit prevents accidental separation of the arm members 19—19 from the body 11 but permits pivotal adjustments of the arm members to different positions and facilitates the separation of the arm members from the body for packing purposes and for ease in inserting the arm members through the sleeves of garments when the doll or mannequin is dressed.

By reason of the fixed bond between the collars 15—15 and the body 11 and the fact that the collars are flexible and resilient, any expansion or contraction caused by heat or cold, or by moisture will be compensated for. Also, should the wooden pins 17—17 expand or contract, a joint may be effected and kept intact due to the characteristics of the material of which the collars 15—15 are made.

While I have shown and described what I consider to be the preferred embodiment of my invention, I wish it to be understood that such changes in construction, design, and equivalents of materials as come within the scope of the appended claims may be resorted to if desired without departing from the spirit of the invention.

Having thus described the invention, what I claim as new and desire to secure by Letters Patent of the United States, is:

1. In a doll having a solid molded non-resilient body of a shape simulating the human figure, said body having a bore of substantially uniform diameter, a rigid porous tubular member within the bore and bonded to the walls thereof, one end of the tubular member terminating short of an adjacent end of the bore, a friction collar set into the end of said bore with its inner end abutting the adjacent end of the tubular member and bonded to the walls of said bore, an extremity member, and a round pivot pin carried by the extremity member and being of a diameter slightly greater than the internal diameter of the collar to necessitate the forcible insertion of the pin into said collar to provide a separable joint between the body and the extremity member.

2. In a doll having a solid molded non-resilient body of a shape simulating the human figure, said body having a bore of substantially uniform diameter extending therethrough from side to side, a pair of resilient porous annular friction collars made of felt-like material set into the bore at the respective ends thereof in spaced axial alinement and bonded to the walls of the bore, a rigid porous tubular spacer member within the bore and bonded to the walls thereof and disposed intermediate the collars with its ends in abutting relation with the respective inner ends of the collars, and a pair of extremity members, each extremity member being provided with a round pivot pin at the upper portion thereof, said pivot pin being of a diameter slightly greater than the internal diameter of the collar in which it is to fit, the pivot pins being respectively forcibly inserted into the respective collars to provide separable pivot joints between the body and the extremity members.

3. In a doll having a solid molded non-resilient body of a shape simulating the human figure, said body having a bore of substantially uniform diameter extending therethrough from side to side, a pair of resilient porous annular friction collars set into the bore at the respective ends thereof in spaced axial alinement and bonded to the walls of the bore, a rigid porous tubular fibre spacer member within the bore and bonded to the walls thereof and disposed intermediate the collars with its ends in abutting relation with the respective inner ends of the collars, and a pair of extremity members, each extremity member being provided with a round pivot pin at the upper portion thereof, said pivot pin being of a diameter slightly greater than the internal diameter of the collar in which it is to fit, the pivot pins being respectively forcibly inserted into the respective collars to provide separable pivot joints between the body and the extremity members.

4. In a doll as set forth in claim 2 in which the tubular spacer member is constructed of fibre.

JACK DE JONG.